(12) United States Patent
Kim

(10) Patent No.: US 8,014,829 B2
(45) Date of Patent: Sep. 6, 2011

(54) METHOD AND APPARATUS OF DISPLAYING OUTPUT OF MOBILE STATION

(75) Inventor: Young-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 12/290,900

(22) Filed: Nov. 5, 2008

(65) Prior Publication Data

US 2009/0131118 A1 May 21, 2009

(30) Foreign Application Priority Data

Nov. 15, 2007 (KR) .................. 10-2007-0116529

(51) Int. Cl.
*H04M 1/00* (2006.01)
*H04B 1/38* (2006.01)
(52) U.S. Cl. ...................................... 455/566
(58) Field of Classification Search .................... 455/566
See application file for complete search history.

(56) References Cited

U.S. PATENT DOCUMENTS

| | | | |
|---|---|---|---|
| 2005/0026657 A1* | 2/2005 | Hasegawa et al. | 455/566 |
| 2008/0133551 A1* | 6/2008 | Wensley et al. | 707/100 |
| 2008/0133736 A1* | 6/2008 | Wensley et al. | 709/224 |
| 2008/0233980 A1* | 9/2008 | Englund et al. | 455/466 |
| 2009/0303254 A1* | 12/2009 | Broms | 345/660 |
| 2010/0030616 A1* | 2/2010 | Criner | 705/10 |
| 2010/0298033 A1* | 11/2010 | Lee | 455/566 |
| 2010/0298662 A1* | 11/2010 | Yu et al. | 600/301 |
| 2011/0001687 A1* | 1/2011 | Srinivasan et al. | 345/3.1 |
| 2011/0034216 A1* | 2/2011 | Yoshino | 455/566 |
| 2011/0061006 A1* | 3/2011 | Song et al. | 715/760 |
| 2011/0065479 A1* | 3/2011 | Nader | 455/566 |
| 2011/0081953 A1* | 4/2011 | Higuchi | 455/566 |

* cited by examiner

*Primary Examiner* — Lincoln Donovan
*Assistant Examiner* — Adam D Houston

(57) ABSTRACT

A mobile station includes a wireless interface, which gains wireless access to Internet via a BTS of a mobile communication network, a storage, which stores bookmark information including information on a title, a URL, or a display mode of at least one WAP page/Web page, a display, which displays the WAP/Web page, an input, which receives the information on the title, the URL, or the display mode of the WAP/Web page, and a central processing unit, which stores the bookmark information, including the information on the title, the URL, or the display mode of the WAP/Web page input through the input, in the storage, and displays the WAP/Web page, based on data downloaded from a server on the Internet accessed through the wireless interface, through the display using the display mode information corresponding to the title information or the URL information of the WAP/Web page.

12 Claims, 3 Drawing Sheets

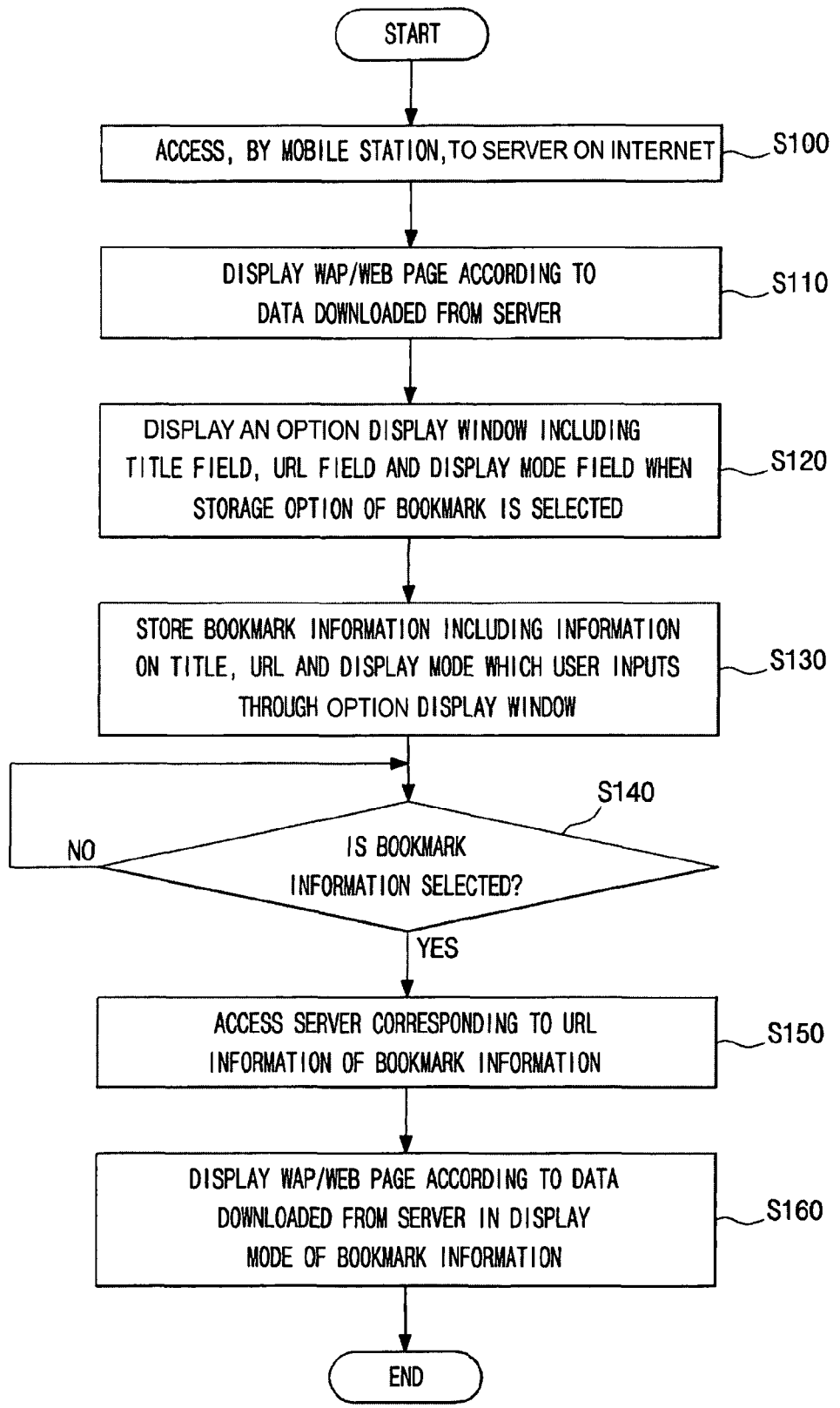

… …

METHOD AND APPARATUS OF DISPLAYING OUTPUT OF MOBILE STATION

CROSS-REFERENCE TO RELATED APPLICATION(S) AND CLAIM OF PRIORITY

The present application makes reference to and claims all benefits accruing under 35 U.S.C. §119 from an application for "METHOD AND APPARATUS OF DISPLAYING OUTPUT OF MOBILE STATION" earlier filed in the Korean Intellectual Property Office on Nov. 15, 2007 and there duly assigned Serial No. 2007-0116529.

TECHNICAL FIELD OF THE INVENTION

The present invention relates to a method and apparatus of displaying an output of a mobile station and, more particularly, to a method and apparatus of displaying an output of a mobile station, in which the mobile station, which provides access to a server of the Internet via a mobile communication network, downloads Internet content, and then displays wireless application protocol (WAP)/Web pages, stores bookmark information including information on titles and uniform resource locators (URLs) of many WAP/Web pages as well as information on display modes, and automatically displays each WAP/Web page in a display mode desired by a user when each WAP/Web page is displayed.

BACKGROUND OF THE INVENTION

Currently, with the development of mobile communication technologies, various supplementary services including a simple voice communication service, such as a wireless internet service capable of downloading data of various types of content through the Internet by wireless, are provided.

Wireless internet service has an advantage in that it enables a mobile station not only to access a server on the Internet, to thereby search for necessary information or confirm an e-mail, but also to download and use various types of wireless internet content such as images, sound sources, games, and so forth. As such, subscribers have a growing interest in wireless internet service.

A mobile service provider providing mobile services processes Internet content in a format suitable for transmission through a mobile communication network on the basis of a wireless application protocol, and then transmits the content to the mobile station without taking into account problems such the limited size of a display screen of the mobile station.

Meanwhile, an initial wireless internet service is a closed environment in which the subscriber is serviced with Internet content provided by a subscribed mobile service provider (e.g. SKT, KTF or LGT). Since a current mobile station supports a full-browsing function, the subscriber can directly input a uniform resource locator to access a Web site (or a Web portal).

In other words, the initial wireless internet service is adapted so that the subscriber accesses a wireless portal established by the subscribed mobile service provider using a WAP browser built in the mobile station, and then uses only the content provided from a server operated by the subscribed mobile service provider. In contrast, the current wireless internet service is adapted so that the subscriber accesses the Web site through the wireless portal of one subscribed mobile service provider as well as that of another subscribed mobile service provider due to the application of full-browsing, and then is serviced with the content.

The mobile station has a relatively small display screen compared to that of a computer such as a personal computer, a laptop computer, and so forth, which gets access to the Internet. Thus, the mobile station cannot display an entire display window of the WAP page or the Web page at one time. As such, a display mode in which the mobile displays the display window of the WAP page or the Web page through the display screen can be classified as a first display mode in which a width of the WAP/Web page is automatically adjusted to a transverse length of the display screen, and a second display mode in which the user shifts the WAP/Web page on the display or causes the WAP/Web page to overlap the entire display.

In order to look at the WAP/Web page using current mobile stations, the user must set the WAP/Web page in the display mode for which the user has a preference. When the display mode is changed, the WAP/Web page is differently displayed. Thus, the data required to change the display mode must be additionally downloaded from the server, so that the user must pay an extra fee.

SUMMARY OF THE INVENTION

To address the above-discussed deficiencies of the prior art, it is a primary object to provide a method and apparatus of displaying an output of a mobile station, in which a wireless application protocol (WAP) page or a Web page is displayed in a display mode for which a user has a preference when displayed through the mobile station supporting a full-browsing function, thereby eliminating trouble caused by setting/changing the display mode.

Further, the present invention is directed to a method and apparatus of displaying an output of a mobile station, in which a user sets a title, a uniform resource locator (URL), and a display mode of a WAP/Web page when storing a bookmark, and thus the WAP/Web page is automatically displayed in a display mode for which a user has a preference when displayed, thereby preventing an extra fee resulting from changing the display mode.

In addition, the present invention is directed to a method and apparatus of displaying an output of a mobile station, in which the mobile station sets a display mode, which is set or is the mode more frequently used by a user, as a basic display mode, and displays a WAP/Web page in the basic display mode, thereby enabling the WAP/Web page to be displayed in the display mode for which a user has a preference.

According to an aspect of the invention, there is provided a mobile station, which includes a wireless interface, which gains wireless access to the Internet by way of a base transceiver station (BTS) of a mobile communication network, a storage, which stores a bookmark information including information on a title, a uniform resource locator (URL), or a display mode of at least one wireless application protocol (WAP) page/Web page, a display, which displays the WAP/Web page, an input, which receives the information on the title, the URL, or the display mode of the WAP/Web page, and a central processing unit, which stores the bookmark information, including the information on the title, the URL, or the display mode of the WAP/Web page input through the input, in the storage, and displays the WAP/Web page, based on data downloaded from a server on the Internet accessed through the wireless interface, using the display mode information corresponding to the title information or the URL information of the WAP/Web page.

Here, the central processing unit may include a bookmark processor, which, when a storage option of a bookmark is selected through the input by a user, displays a selected display window including a title field, a URL field and a display mode field, into which the information on the title; the URL or the display mode of the wireless application protocol page/Web page is entered, and stores the bookmark information, which includes the information on the title, the URL, and the display mode input in the storage, and a display window processor, which, when the title information or the URL information of one of the wireless application protocol pages/Web pages is selected from a list of the bookmark information through the input, accesses the server on the Internet corresponding to the title or the URL of interest, processes the data downloaded from the server, and displays the data in the display mode corresponding to the title information or the URL information, and then displays it through the display.

Further, the display mode may include one of a first display mode in which a width of the WAP/Web page is automatically adjusted to a transverse length of the display, and a second display mode in which the user shifts the WAP/Web page on the display or causes the WAP/Web page to overlap the entire display.

Meanwhile, the central processing unit may display the WAP/Web page in a basic display mode when the display mode information corresponding to the title information or the URL information selected by the user is not set or when the user sets the display mode as the basic display mode, the display mode in which last the WAP/Web page is displayed or is more frequently used is set as the basic display mode.

Further, the central processing unit may display the WAP/Web page according to the display mode information corresponding to the URL information when the URL information directly input through the input by the user is included in the bookmark information.

According to another aspect of the present invention, there is provided a method of displaying an output of a mobile station, which includes accessing, by the mobile station, a server on the Internet by way of a mobile communication network, and displaying a WAP/Web page according to data downloaded from the server, storing bookmark information including information on a title, a URL, or a display mode of at least one WAP/Web page when a storage option of a bookmark is selected by a user, downloading the data from the server when the information on the title or the URL is selected from the bookmark information by the user, and displaying the WAP/Web page according to the display mode corresponding to the information on the title or the URL of the WAP/Web page.

Here, the method may further include displaying a selected display window including a title field, a URL field and a display mode field, into which the information on the title, the URL or the display mode of the corresponding WAP/Web page is entered when the storage option of the bookmark is selected.

Further, the storing of the bookmark information may include storing the bookmark information, which includes the information on the title, the URL, and the display mode of at least one wireless application protocol page/Web page entered using the selected display window.

Also, the method may further include setting the display mode, in which the last WAP/Web page is displayed or is more frequently used, as a basic display mode, and displaying the WAP/Web page in the basic display mode when the display mode information corresponding to the title information or the URL information selected by the user is not set or when the user sets the display mode as the basic display mode.

In addition, the method may further include displaying the WAP/Web page according to the display mode information corresponding to the URL information when the URL information directly input through the input by the user is included in the bookmark information.

According to the present invention, the mobile station stores the bookmark information including the information on the titles and URLs of many WAP/Web pages as well as the information on the display modes, and automatically displays each WAP/Web page in the display mode desired by the user when each WAP/Web page is displayed. As a result, the user does not need to change the display mode, and thus can eliminate a burden of the extra fee occurring by changing the display mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a flow chart illustrating a method of displaying an output of a mobile station according to an exemplary embodiment of the present invention.

DETAILED DESCRIPTION OF THE INVENTION

Figure 1:
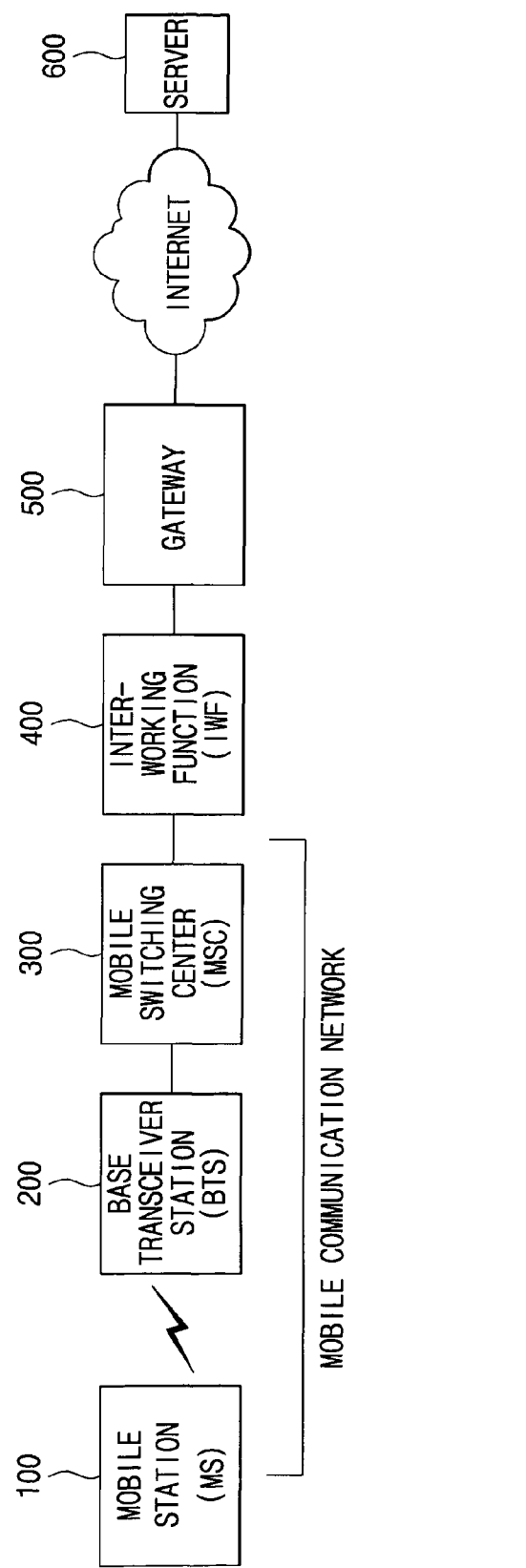
FIG. 1 is a block diagram illustrating a mobile communication system to which the present invention is applied.
Figure 2:
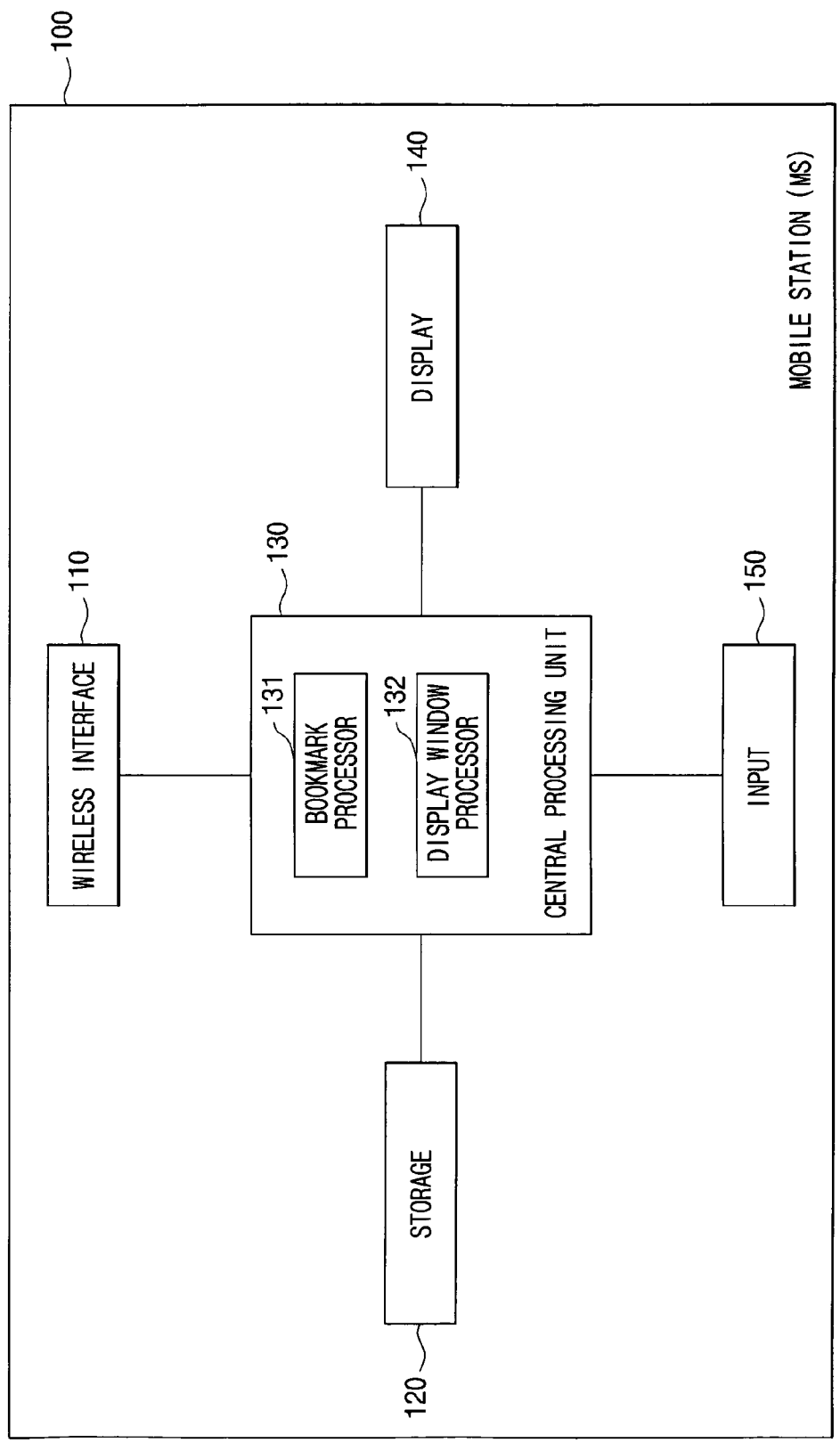
FIG. 2 is a block diagram illustrating a mobile station according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication station.

FIG. 1 is a block diagram illustrating a mobile communication system to which the present invention is applied.

Referring to FIG. 1, the mobile communication system comprises a mobile station (MS) 100, a base transceiver station (BTS) 200 providing wireless access to the MS 100, a mobile switching center (MSC) 300 processing calls, supplementary services, and so forth of the MS 100 gaining wireless access to the BTS 200, an inter-working function (IWF) 400 interworking a mobile communication network with another communication network (e.g., Internet), a gateway 500 converting a protocol stack between the mobile communication network and the Internet, and a server 600 providing Internet content data such as wireless application protocol (WAP)/Web page data.

The MS 100 gains access to the Internet through the mobile communication network, processes data downloaded from the server 600, and displays a WAP/Web page provided from the server 600.

Further, the MS 100 provides voice communication service for a call, which is sent to the BTS 200 by the MSC 300, at the request of a user, or transmits short message information input by the user to a called MS through a short message service (SMS).

The BTS 200 can be configured of a wireless transceiver, an antenna, a controller, a data terminal, a power supply, and so forth, and enables the MS 100 gaining wireless access to be connected to the MSC 300.

The MSC 300 can be configured of a controller, a speech path unit, and peripherals, and processes incoming and outgoing calls occurring through each BTS 200, and controls each BTS 200 to be efficiently operated.

The gateway 500 converts a hypertext transfer protocol (HTTP) stack into a WAP stack, and conversely the WAP stack into the HTTP stack, thereby enables the MS 100 to receive data from the server 600 to which the MS 100 gains access through the Internet.

The Internet can include a domain name system (DNS) server (not shown), a WAP server (not shown), a Web server (not shown), and so forth. A DNS server manages a database for a domain name of the Internet and its corresponding internet protocol (IP) address, and provides the IP address of the domain name which either the IWF 400 or the gateway 500 queries. A WAP server enables the MS 100 to gain access to the WAP page on the basis of Internet use information of each user. The Web server enables the MS 100 to access the Web page.

The IWF 400 causes heterogeneous networks, for instance the mobile communication network and the Internet to interwork with each other. In other words, the IWF 400 enables the MS 100 to access the Internet though the mobile communication network to thereby download data from the server 600.

The server 600 transmits data to display the WAP/Web page at the request of the MS 100 gaining access through the mobile communication network. For example, when the MS 100 gains access to the server 600 corresponding to the URL input by the user, the server 600 transmits the data of the WAP/Web page to the MS 100.

As for the process of the MS 100 gaining access to the sever 600 to display the WAP/Web page, the MS 100 gains wireless access to the mobile communication network by way of the BTS 200.

When receiving a request for Internet access from the MS 100, the MSC 300 causes the MS 100 to access the Internet through the IWF 400, thereby enabling the MS 100 to access the server 600 corresponding to the URL input by the user.

When the server 600 is accessed by the MS 100, the server transmits the data capable of displaying the WAP/Web page to the MS 100.

Thus, the MS 100 processes the data received from the server 600, and then displays the WAP/Web page.

A display mode in which the MS 100 displays the WAP/Web page is classified as a first display mode in which a width of the WAP/Web page is automatically adjusted to the transverse length of a display 140 (FIG. 2) when displayed, and a second display mode in which user shifts the WAP/Web page on the display 140 or causes the WAP/Web page to overlap the entire display 140. The MS 100 displays the of the WAP/Web page in the display mode set by the user.

FIG. 2 is a block diagram illustrating an MS according to an exemplary embodiment of the present invention.

Referring to FIG. 2, the MS 100 includes a wireless interface 110 for gaining wireless access to the BTS 200, an input having a plurality of keys, a display 140 implemented by a display device such as a liquid crystal display (LCD), a storage storing information about programs and bookmarks of the MS 100, and a central processing unit 130, which allows the MS 100 to access the BTS 200 according to a choice of the user, establishes a call, and provides voice communication service, and which allows the MS 100 to access the server 600 and provides data communication service. The central processing unit 130 includes a bookmark processor 131 and a display window processor 132.

The wireless interface 110 allows the MS 100 to access the BTS 200, thereby enabling the MS 100 to receive the data from the server 600.

Hereinafter, the present invention will be described regarding the case in which the MS 100 accesses the server 600 to display the WAP/Web page. However, the present invention can be equally applied to the case in which the MS 100 changes the WAP/Web page according to a choice of the user after the MS 100 displays the WAP/Web page.

The display 140 displays a display window according to display information received from the central processing unit 130. The display window may be a window of the WAP/Web page.

The input 150 transmits input information corresponding to the key selected by the user to the central processing unit 130. The input information includes information for accessing the server 600, URL information of the server 600, mode setup information setting display mode of the WAP/Web page, bookmark storage request information for storing the bookmark information, bookmark selection information for selecting the WAP/Web page desired by the user, and so forth.

The storage 120 can be implemented as a database structure, and stores the bookmark information, operation program information of the MS 100, and so forth.

The bookmark information includes information on titles and URLs of the WAP/Web pages as well as mode setup information.

The following Table 1 is for explaining a structure of the bookmark information according to the present invention.

TABLE 1

| Title | URL | Display Mode |
| --- | --- | --- |
| Home Page | xxxxxxx | First Display Mode |
| Main Confirmation | yyyyyy | Second Display Mode |
| ... | ... | ... |

As shown in Table 1, the bookmark information includes information on titles of the WAP/Web pages, the URLs of the WAP/Web pages corresponding to the respective titles, and information on the display modes in which the corresponding WAP/Web pages are displayed. The display mode information can be set for each WAP/Web page through the input 150.

When the user requests voice communication through the input 150, the central processing unit 130 gains access to the BTS 200 through the wireless interface 110, establishes the voice communication with a counterpart MS 100 through the call set by the MSC 300. Further, when the user requests access to the Internet, the central processing unit 130 gains access to the server 600 on the Internet by way of the mobile communication network.

When the access to the server 600 is gained at the request of the access to the Internet, the central processing unit 130 downloads the data capable of displaying the WAP/Web page from the server 600, and then displays the WAP/Web page through the display 140.

When the storage option of the bookmark is selected through the input 150 by the user, the bookmark processor 131 of the central processing unit 130 displays a selected display window including a title field, a URL field and a display mode field, into which the user can input the title, the URL and the display mode of each corresponding WAP/Web page, and stores the information on the title, the URL and the display mode input by the user, in the storage 120.

In this manner, when the storage option of the bookmark is selected, the bookmark processor 131 can automatically input the information on the title and URL of the WAP/Web page currently displayed into the title field and the URL field of the selected display window, and store the information on the display mode in the storage 120.

Further, the bookmark processor 131 can store the bookmark information shown in Table 1 in the storage 120 in a file system structure.

Meanwhile, when the user selects the bookmark information, for instance when the user selects the information on the title or the URL of the desired WAP/Web page from the list of the bookmark information stored in the storage 120, the display window processor 132 of the central processing unit 130 accesses the server 600 on the Internet according to the URL information corresponding to the selected title information.

Then, the display window processor 132 processes the display window according to the data downloaded from the server 600 on the basis of the display mode information corresponding to the title or URL information, and then display it through the display 140.

Further, the display window processor 132 decides whether or not the URL information directly input through the input 150 by the user is included in the bookmark information. If the URL information directly input by the user is included in the bookmark information, the display window processor 132 displays the WAP/Web page through the display 140 using the display mode information corresponding to the URL information.

Thus, the user stores the information on the titles, URLs and desired display modes of the WAP/Web pages as the bookmark information. Thereby, when the user gains access to each WAP/Web page, the WAP/Web page is adapted to be displayed according to the display mode information stored in the bookmark information. Thus, when each WAP/Web page is displayed, it is not necessary to change it into the display mode desired by the user. Accordingly, the WAP/Web pages can be displayed according to preference of the user.

Meanwhile, the central processing unit 130 can set a basic display mode in which the MS 100 displays the WAP/Web page through the display 140. If the display mode information corresponding to the title or URL information selected by the user is not set, the MS 100 displays the WAP/Web page in a preset basic display mode.

The central processing unit 130 can set the display mode of the last WAP/Web page as the basic display mode, or calculate how many times the display mode of the last WAP/Web page is used, namely how often the display mode in which the WAP/Web page is displayed is used, and thereby set the display mode that is more often used as the basic display mode.

Thus, the user can display the WAP/Web page in the basic display mode (e.g., in the display mode frequently used) or in the desired display mode without setting a separate display mode.

FIG. 3 is a flow chart illustrating a method of displaying an output of a mobile station according to an exemplary embodiment of the present invention.

Referring to FIG. 3, the MS 100 gains access to the server 600 on the Internet by way of a mobile communication network The MS 100 processes data downloaded from the server 600, and then displays a WAP/Web page on the display 140 (S110).

When the storage option of a bookmark is selected through the input 150 by the user, the MS 100 displays a selected display window including a title field, a URL field, and a display mode field (S120).

Then, the MS 100 stores information on the bookmark, in which information on the title, URL and display mode which the user inputs through the option display window, in the storage 120 (S130).

The bookmark information, which the MS stores in the storage 120, includes the information on the title, URL and display mode of each WAP/Web page, and can be stored in the storage 120 in a file system structure.

Meanwhile, when the storage option of the bookmark is selected in the state in which the WAP/Web page is currently displayed, the MS 100 automatically inputs the information on the title and URL of the WAP/Web page currently displayed into the title field and the URL field of the selected display window, receives the information on the display mode, and stores the information on the display mode in the storage 120.

Subsequently, the MS 100 checks whether or not the user selects the information on the title or the URL of the desired WAP/Web page from a list of the bookmark information (S140). If the user selects the bookmark information (i.e., the information on the title or the URL of the desired WAP/Web page), the MS 100 gains access to the server 600 corresponding to the URL information, which corresponds to the title selected by the user (S150).

Then, the MS 100 processes the data downloaded from the server 600, and displays the WAP/Web page corresponding to the title or URL information selected by the user in the display mode corresponding to the title (S160).

At this time, when the user directly inputs the URL information through the input 150, the MS 100 checks whether or not the directly input URL information is included in the bookmark information. If the directly input URL information is included in the bookmark information, the MS 100 displays the WAP/Web page through the display 140 in the display mode corresponding to this URL information.

Meanwhile, although the display mode is set as the basic display mode, for instance although the display mode in which the last WAP/Web page is displayed is set as the basic display mode, or although a most frequently used display mode obtained by calculating how many times the display mode of the last WAP/Web page is used is set as the basic display mode, the MS 100 displays the WAP/Web page in the basic display mode when the display mode information corresponding to the title or URL information selected by the user is not set or when the user sets the display mode as the basic display mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile station comprising:
a wireless interface, which provides wireless access to the Internet by way of a base transceiver station of a mobile communication network;
a storage, which stores a bookmark information including information on a title, a uniform resource locator, or a display mode of a wireless application protocol page/Web page;
a display, which displays the wireless application protocol page/Web page;
an input, which receives the information on the title, the uniform resource locator, or the display mode of the wireless application protocol page/Web page; and
a central processing unit, which stores the bookmark information, including the information on the title, the uniform resource locator, or the display mode of the wireless application protocol page/Web page input through the input in the storage, and displays the wireless application protocol page/Web page, based on data downloaded from a server on the Internet accessed through the wireless interface, using the display mode information corresponding to the title information or the uniform resource locator information of the wireless application protocol page/Web page.

2. The mobile station according to claim 1, wherein the central processing unit includes:
a bookmark processor, which, when a storage option of a bookmark is selected through the input by a user, displays a selected display window including a title field, a uniform resource locator field and a display mode field into which the information on the title, the uniform resource locator or the display mode of the wireless application protocol page/Web page is entered, and stores the bookmark information, which includes the information on the title, the uniform resource locator, and the display mode input through the selected display window in the storage; and
a display window processor, which, when the title information or the uniform resource locator information of one of the wireless application protocol pages/Web pages is selected from a list of bookmark information through the input, accesses the server on the Internet corresponding to the title or the uniform resource locator selected, processes the data downloaded from the server, and displays the data in the display mode corresponding to the title information or the uniform resource locator information selected in the display.

3. The mobile station according to claim 1, wherein the display mode includes one of a first display mode in which a width of the wireless application protocol page/Web page is automatically adjusted to a transverse length of the display, and a second display mode in which the user shifts the wireless application protocol/Web page on the display or causes the wireless application protocol/Web page to overlap the entire display.

4. The mobile station according to claim 1, wherein the central processing unit displays the wireless application protocol page/Web page in a basic display mode when the display mode information corresponding to the title information or the uniform resource locator information selected by the user is not set or when the user sets the display mode as the basic display mode,
wherein the display mode in which the last wireless application protocol page/Web page is displayed or the display mode more frequently used by the user is set as the basic display mode.

5. The mobile station according to claim 1, wherein the central processing unit displays the wireless application protocol page/Web page according to the display mode information corresponding to the uniform resource locator information when the uniform resource locator information directly input through the input by the user is included in the bookmark information.

6. A method of displaying an output of a mobile station, comprising:
accessing, by the mobile station, a server on the Internet by way of a mobile communication network, and displaying a wireless application protocol page/Web page according to data downloaded from the server;
storing bookmark information including information on a title, a uniform resource locator, or a display mode of at least one wireless application protocol page/Web page when a storage option of a bookmark is selected by a user;
downloading the data from the server when the information on the title or the uniform resource locator is selected from the bookmark information by the user; and
displaying the wireless application protocol page/Web page according to the display mode corresponding to the information on the title or the uniform resource locator.

7. The method according to claim 6, further comprising displaying a selected display window including a title field, a uniform resource locator field and a display mode field, into which the information on the title, the uniform resource locator or the display mode of the corresponding wireless application protocol page/Web page is entered when the storage option of the bookmark is selected.

8. The method according to claim 7, wherein the title, the uniform resource locator, and the display mode entered into the selected display window is stored.

9. The method according to claim 6, further comprising:
setting the display mode in which the last wireless application protocol page/Web page is displayed or the display mode used more frequently as a basic display mode; and
displaying the wireless application protocol page/Web page in the basic display mode when the display mode information corresponding to the title information or the uniform resource locator information selected by the user is not set or when the user sets the display mode as the basic display mode.

10. The method according to claim 6, further comprising displaying the wireless application protocol page/Web page according to the display mode information corresponding to the uniform resource locator when the uniform resource locator information directly input through the input by the user is included in the bookmark information.

11. A mobile station comprising:
a wireless interface, which provides wireless access to the Internet by way of a base transceiver station of a mobile communication network;
a storage, which stores a bookmark information including information on a title, a uniform resource locator, or a display mode of a plurality of wireless application protocol page/Web pages;

a display, which displays the wireless application protocol page/Web page; and a central processing unit, which determines if a uniform resource locator information directly input by a user matches a uniform resource locator in storage, and if the uniform resource locator information directly input by the user matches a uniform resource locator in storage, displays the wireless application protocol page/Web page corresponding to the input uniform resource locator according to the display mode information of the uniform resource locator in the storage.

12. A method of displaying an output of a mobile station, comprising:

accessing, by the mobile station, a server on the Internet by way of a mobile communication network, and displaying a wireless application protocol page/Web page according to data downloaded from the server;

storing bookmark information including information on a title, a uniform resource locator, or a display mode of at least one wireless application protocol page/Web page when a storage option of a bookmark is selected by a user; and determining if a uniform resource locator information directly input by the user matches a stored uniform resource locator, and if the uniform resource locator information directly input by the user matches a stored uniform resource locator, displaying the wireless application protocol page/Web page corresponding to the input uniform resource locator according to the display mode information of the stored uniform resource locator.

* * * * *